US007332100B2

(12) United States Patent
Giovanola et al.

(10) Patent No.: US 7,332,100 B2
(45) Date of Patent: Feb. 19, 2008

(54) PROCESS FOR PROTECTIVELY COATING HYDRAULIC MICROCIRCUITS AGAINST AGRESSIVE LIQUIDS, PARTICULARLY FOR AN INK JET PRINTHEAD

(75) Inventors: Lucia Giovanola, Ivrea (IT); Renato Conta, Ivrea (IT)

(73) Assignee: Telecom Italia S.p.A., Milan (IT)

( * ) Notice: Subject to any disclaimer, the term of this patent is extended or adjusted under 35 U.S.C. 154(b) by 327 days.

(21) Appl. No.: 10/539,121

(22) PCT Filed: Dec. 19, 2003

(86) PCT No.: PCT/IT03/00843

§ 371 (c)(1),
(2), (4) Date: Jun. 16, 2005

(87) PCT Pub. No.: WO2004/056573

PCT Pub. Date: Jul. 8, 2004

(65) Prior Publication Data

US 2006/0066659 A1 Mar. 30, 2006

(30) Foreign Application Priority Data

Dec. 19, 2002 (IT) .......................... TO2002A1099

(51) Int. Cl.
*G01D 15/00* (2006.01)
*G11B 5/127* (2006.01)

(52) U.S. Cl. ........................................................ 216/27

(58) Field of Classification Search .................. 216/24; 438/21; 29/890.1
See application file for complete search history.

(56) References Cited

U.S. PATENT DOCUMENTS 5,322,594 A * 6/1994 Bol ............................ 216/27
5,733,433 A * 3/1998 Lee et al. .................. 205/665
6,045,215 A 4/2000 Coulman
6,423,241 B1 7/2002 Yoon et al.
2001/0012036 A1 8/2001 Matthew et al.

* cited by examiner

*Primary Examiner*—Roberts Culbert
(74) *Attorney, Agent, or Firm*—Venable LLP; Robert Kinberg; Steven J. Schwarz

(57) ABSTRACT

Process for protectively coating against aggressive liquids hydraulic microcircuits made in a resin, particularly for an ink jet printhead, consisting of: disposing of a silicon substrate comprising a sacrificial layer of copper, deposited on the substrate and defining the inner shape of the hydraulic microcircuits; depositing on top of the outer surface of the sacrificial layer, by means of an electrochemical process, at least one protective, metallic coating layer; applying on the sacrificial layer a non-photosensitive epoxy or polyamide resin, having a predetermined thickness and suitable for completely covering the sacrificial layer; effecting a polymerization of the resin to increase its mechanical resistance to mechanical and thermal stresses and performing a planarization of the outer surface of the resin, by means of a mechanical lapping and simultaneous chemical treatment; removing the sacrificial layer through a chemical etching in a highly acid bath; and depositing a metallic, protective layer on the outer surface of the resin through vacuum evaporation.

7 Claims, 5 Drawing Sheets

PROCESS FOR PROTECTIVELY COATING HYDRAULIC MICROCIRCUITS AGAINST AGRESSIVE LIQUIDS, PARTICULARLY FOR AN INK JET PRINTHEAD

CROSS-REFERENCE TO RELATED APPLICATIONS

Benefit of the Dec. 19, 2003 filing date of International Application PCT/IT 2003/000843 and benefit of the Dec. 19, 2002 filing date of Italian Application TO 2002 A 001099 are claimed. The above-referenced applications are hereby incorporated by reference in their entireties.

TECHNOLOGICAL AREA OF THE INVENTION

This invention relates to a process for protectively coating hydraulic microcircuits against aggressive liquids, such as for example microcircuits for biomedical uses, MEMS, drinks dispensers, and microcircuits employed in various types of ink jet printheads.

More in particular this invention is intended for a process for producing a protective coating of the inner walls of the ink ejection chambers of an ink jet printhead, to reduce the damaging effects on the resin layers in which the ejection chambers are built, caused by the corrosive action of particularly aggressive inks. In addition, the invention relates to the process of protectively coating not only the inner walls of the ejection chambers, but also and at the same time the inner walls of the feeding ducts, hydraulically connected to the chambers and the inner walls of the nozzles ejecting the droplets of ink.

BRIEF DESCRIPTION OF THE CURRENT STATE OF THE ART

Ink jet printheads are known in the current state of the art, for which measures have been taken to limit the corrosive action of the inks on the structural layers, inside which the ejection chambers, feeding ducts and also any injection nozzles are made.

In the current state of the art, an ink jet printhead is known in which the structural layer encapsulating the ejection chambers, feeding ducts and injection nozzles is produced by way of the deposition of a layer of metal, for instance nickel, itself already very resistant to the aggressive agents of the inks. However this solution has the drawback of having considerable complications during its manufacturing process; for example, one difficulty is that of growing a metal uniformly starting from a substrate with existing sacrificial metallic or dielectric microstructures, which, in the case of the former, would create surface protuberances and, in the latter case, depressions in the structural layer.

In addition, the deposition of a metallic layer of relatively significant thickness, in the order of approximately 60-70 μm, produces strong mechanical stresses in the zones where the metallic structural layer is soldered to the layers underneath.

What's more, the process of making chambers and relative feeding ducts in a completely metallic structural layer, requires extremely high work times, with consequent repercussions on the final costs of a printhead obtained in this way.

SUMMARY DESCRIPTION OF THE INVENTION

The object of this invention is to present a process of coating hydraulic microcircuits to protect them from aggressive liquids, minus the drawbacks outlined above, and more in particular, to simply and effectively produce a protection for the hydraulic microcircuits against the damaging effects of the inks, for an ink jet printhead.

Another object of the invention is to present a manufacturing process for an ink jet printhead in which the inner walls of the chambers, feeding ducts and nozzles, made in a structural layer of dielectric material, such as non-photosensitive epoxy or polyamide resin, are treated in such a way as to offer high resistance to the aggressive agents of the inks employed.

Another object of the invention is to treat the inner walls of the hydraulic microcircuits of an ink jet printhead, to render them particularly insensitive to the damaging effects of the aggressive agents contained in the inks used.

In accordance with this invention, the process for protectively coating hydraulic microcircuits of an ink jet printhead, particularly resistant to aggressive inks and the printhead thus obtained are presented, being characterized as defined in the respective main claims.

This and other characteristics of the invention will appear more clearly from the following description of a preferred embodiment of an ink jet printhead and of the relative manufacturing process, provided as a non-restrictive example, with reference to the figures in the accompanying drawings.

DETAILED DESCRIPTION OF A PREFERRED EMBODIMENT

Although the main object of this invention is that of producing a protective coating for hydraulic microcircuits against aggressive liquids, the following description will refer particularly to an ink jet printhead, in simplified, non-restrictive form and for reasons of simplicity and clarity of the description, it being understood in any case that this invention has a much wider relevance and is in general intended, as already said, for producing a protective coating for hydraulic microcircuits against aggressive liquids.

As anticipated, this description refers to a process relating to an ink jet printhead for treating the inner walls of the chambers, feeding ducts and nozzles of said head, in such a way as to offer high resistance against the aggressive agents of the inks employed; it is clear that the process mainly, though not exclusively, concerns the final part of manufacture of the head.

In the description that follows, therefore, the initial steps of manufacture of the printhead will not be described in detail, as these belong to the state of the art, well-known to those acquainted with the sector art, but the process of manufacturing the chambers, relative feeding ducts and injection nozzles, according to the invention, may be considered as applying to a conventional ink jet printhead, made in a first step in a way known in the state of the art.

Figure 1:
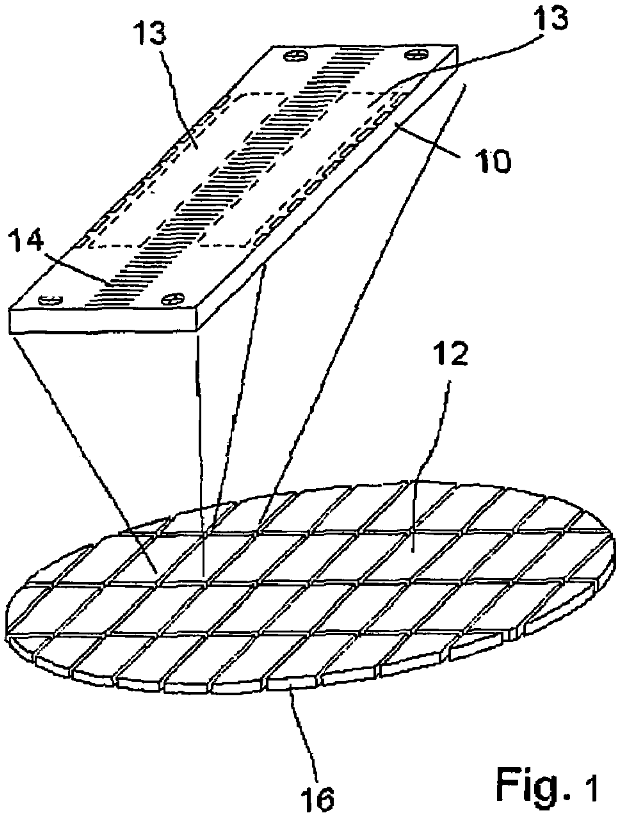
FIG. 1 represents a perspective view of a silicon wafer, on which a plurality of "die" not yet separated is indicated.

Depicted in FIG. 1 by way of an example is a wafer 10 of crystalline silicon, on which die 12 are indicated, constituting a like number of conventional type ink jet printheads, not yet separated; the figure represents one of the die, in enlarged view, in which two zones 13 are indicated in which the driving microcircuits are arranged and the zone 14 enclosing the nozzles 15.

Figure 3:
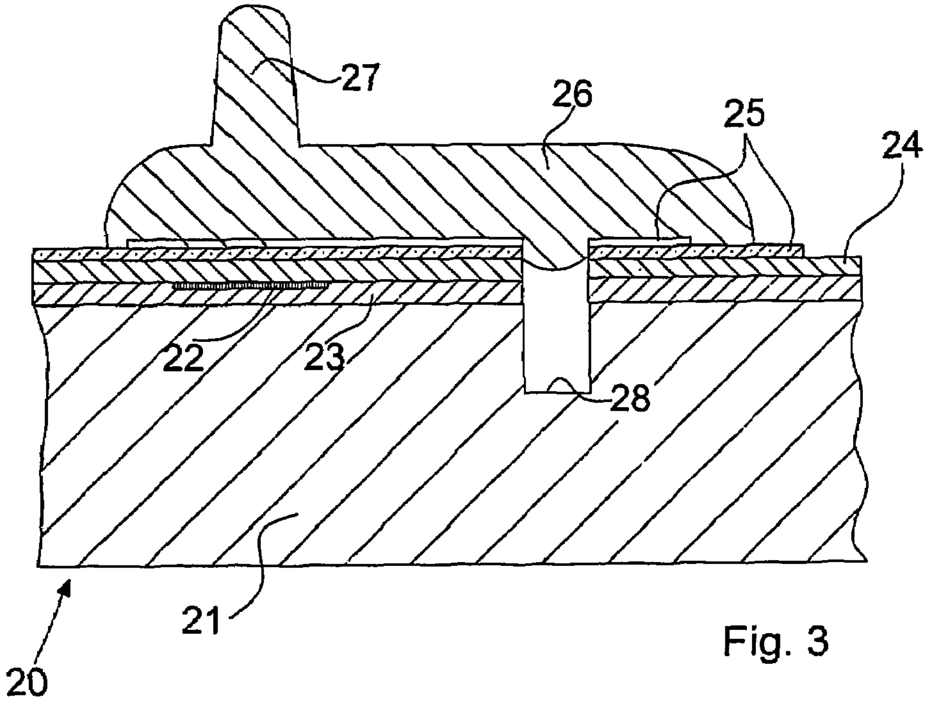
FIG. 3 represents a section, taken according to the line III-III in FIG. 2.

In FIG. 3, represented by way of non-restrictive example is the section of a conventional ink jet printhead, in the state it is in after a first manufacturing phase, known in itself, in which the manufacturing process has come to the deposition of a sacrificial layer of copper in the zone where the chambers, relative feeding ducts and nozzles will be made; in particular, FIG. 3 shows this printhead, in which a die 20 can be seen which is made up of a substrate of silicon 21 covered by a plurality of metallic and dielectric layers, in which an array of microcircuits has been made for driving thermal elements 22, or resistors, for expulsion of said ink. This plurality of layers, known in themselves in the sector art, is represented for simplicity of the description, by a single layer 23, on top of the silicon layer 21.

The thermal elements 22 are covered by a protective layer 24, consisting of a deposit of silicon nitride and carbide ($Si_3N_4$, SiC), which is in turn covered by a layer 25 made of tantalum and gold, forming the so-called "seed layer". Deposited on the layer 25 is a sacrificial metallic layer 26, provided with a protuberance 27, constituting the cast of at least one ejection nozzle, not depicted.

Figure 2:
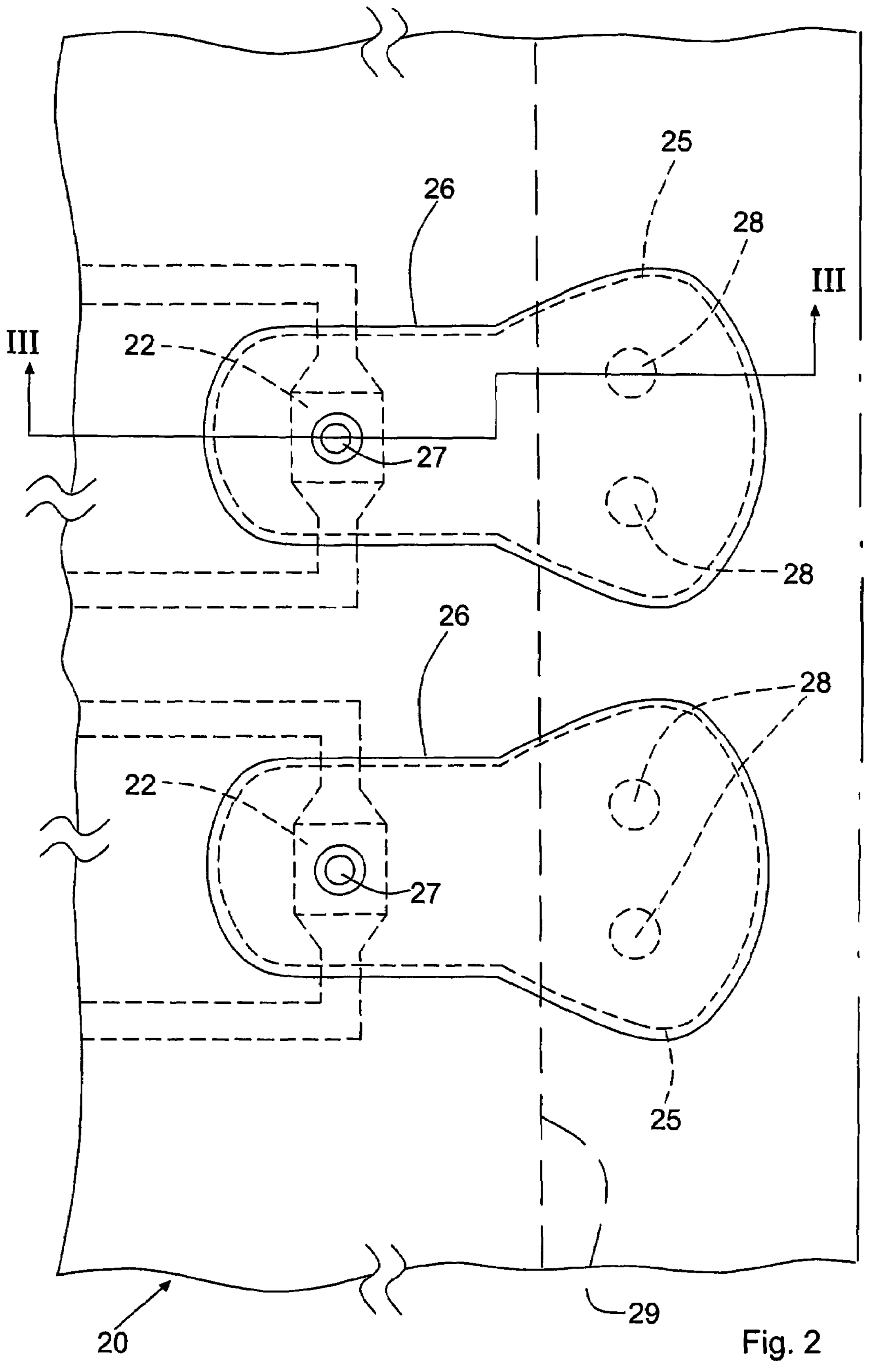
FIG. 2 represents a plan view of a portion of a die of FIG. 1 for an ink jet printhead, after a first manufacturing step and before building the chambers, relative feeding ducts and nozzles, using the process proposed in accordance with this invention.

Also visible in FIGS. 2 and 3 are two feeding holes 28, suitable for bringing the ink into the ejection chambers, not shown in the figures, as they are the object of this invention and are described later; the holes 28 will subsequently be put in hydraulic communication with a slot 29, not shown in the figures, as it is made later in a step of this process and also described later.

The object of this invention, as stated in the early part of the description, consists in coating the inner walls of the chambers, of the relative feeding ducts connected to them and of the nozzles, with one or more protective layers of noble metals, for the purpose of eliminating the damaging effects produced by particularly aggressive inks.

All this is obtained by depositing on the outer surface of the sacrificial layer, already present, one or more layers of noble metals, such as for example nickel-gold, palladium-gold, rutenium, etc. Said layers, after the removal of the sacrificial layer, will remain adhering to the inner walls of the chambers and of the other adjacent compartments, created in a structural layer of resin deposited previously.

At the end of this operation, chambers, feeding channels and nozzles are obtained with inner walls completely coated by the layer of noble metals, and therefore effectively protected from the aggressive action of the inks employed.

Naturally the inner shape of the chambers, feeding ducts and nozzles represents the true impression of the sacrificial layer, because the upper surface of the chambers and the ducts connected to them faithfully reproduce the outer surface of the sacrificial layer.

In particular, where the ink jet printhead used is that described in the Italian patent application entitled "Ink jet printhead and relative manufacturing process", corresponding to the International patent application WO 2004/056574 A1, filed by the same applicant, and the manufacturing process that this invention refers to is applied, concave-shaped upper inner walls of the chambers and of the feeding ducts connected to them would be obtained, a faithful copy of the corresponding shape of the sacrificial layer made using the process described in the already cited International patent application.

In the latter case, the twin advantage would be obtained of great resistance of the chambers and feeding ducts to the aggressive agents in the inks and a more effective prevention of air bubbles becoming attached to particular points of the walls, with optimization of the phase in which the expulsion bubble is developed.

Figure 4:
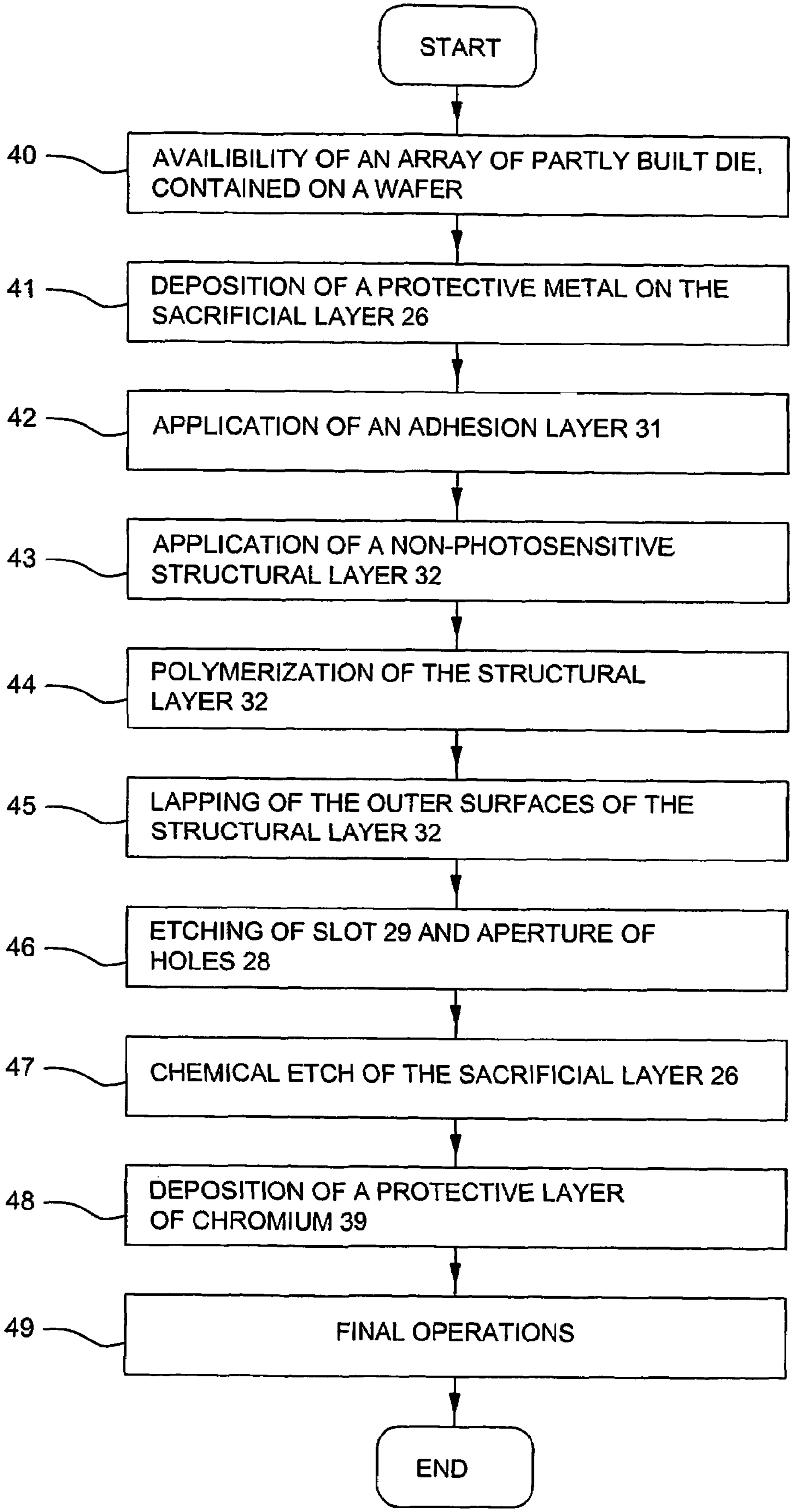
FIG. 4 shows a flow diagram of the manufacturing process of the chambers, feeding ducts and nozzles of the ink jet printhead, according to the invention.

Accordingly the process for producing chambers, relative feeding ducts and protected nozzles, according to this invention, continues starting from the state of progress of manufacture of a printhead, by way of non-restrictive example, of the type described in the cited international patent application WO 2004/056574 A1, shown in FIG. 3, and proceeds in the steps described in the flow diagram of FIG. 4, integrated with the explanatory drawings in FIGS. 5 to 8.

In step 40, a wafer 10 (FIG. 1) is made available, comprising a plurality of partially constructed die 12, up to the stage depicted in FIG. 2, in which, as already recalled, a still uncovered sacrificial layer 26, 27 of copper is present.

Figure 5:
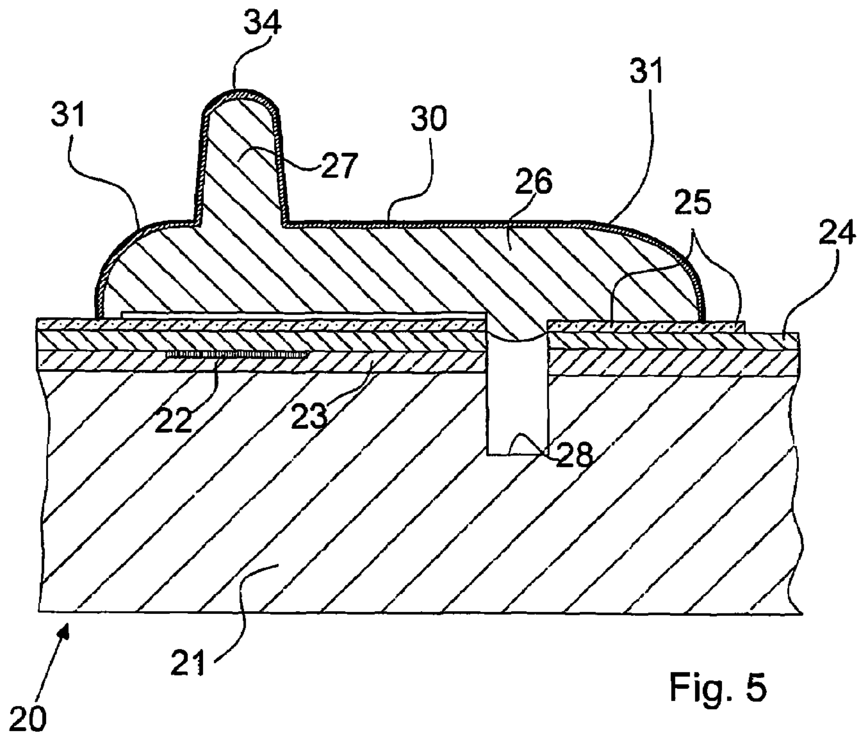
FIGS. 5 to 8 illustrate the successive steps in manufacture of the chambers, feeding ducts and nozzles of the printhead of FIG. 3, according to this invention.
Figure 6:
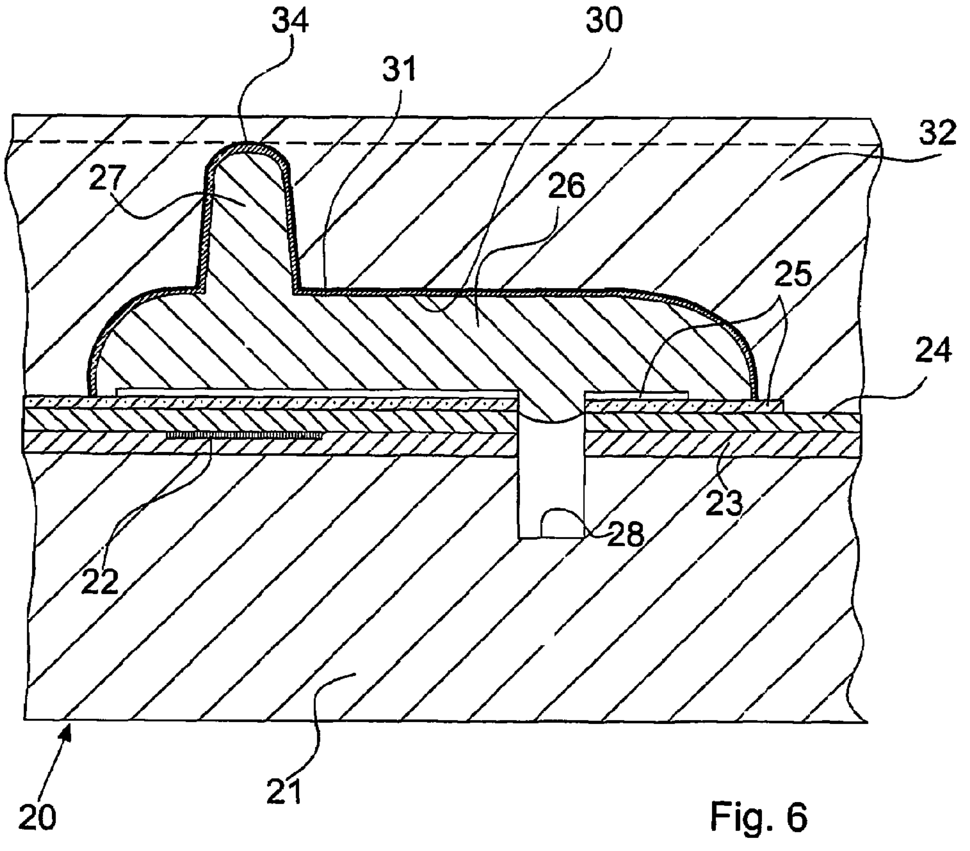

In step 41, illustrated in FIG. 5, a coating layer 30 of noble metals, such as for example nickel-gold is deposited on the sacrificial layer 26 and on the cast 27 of the nozzle. Alternatively, the coating layer 30 may be of palladium-gold, or of rutenium, etc.; the deposition is performed through an electrochemical process, of a type known to those acquainted with the sector art.

In step 42, an adhesion layer 31 is applied on the layer 30 of noble metals to promote perfect adhesion, through molecular bonds, of the layer of resin, which will be applied in the next step.

In step 43, a structural layer 32 (FIG. 6), made of a film of non-photosensitive epoxy or polyamide resin, is deposited through lamination on the coating layer 30, covered by the adhesion layer 31; this type of material is used to advantage to offer greater resistance to the aggressive environment created by particularly aggressive inks.

In step 44, polymerization is performed of the structural layer 32 to increase its resistance to the mechanical and thermal stresses, that develop during operation of the head.

Figure 7:
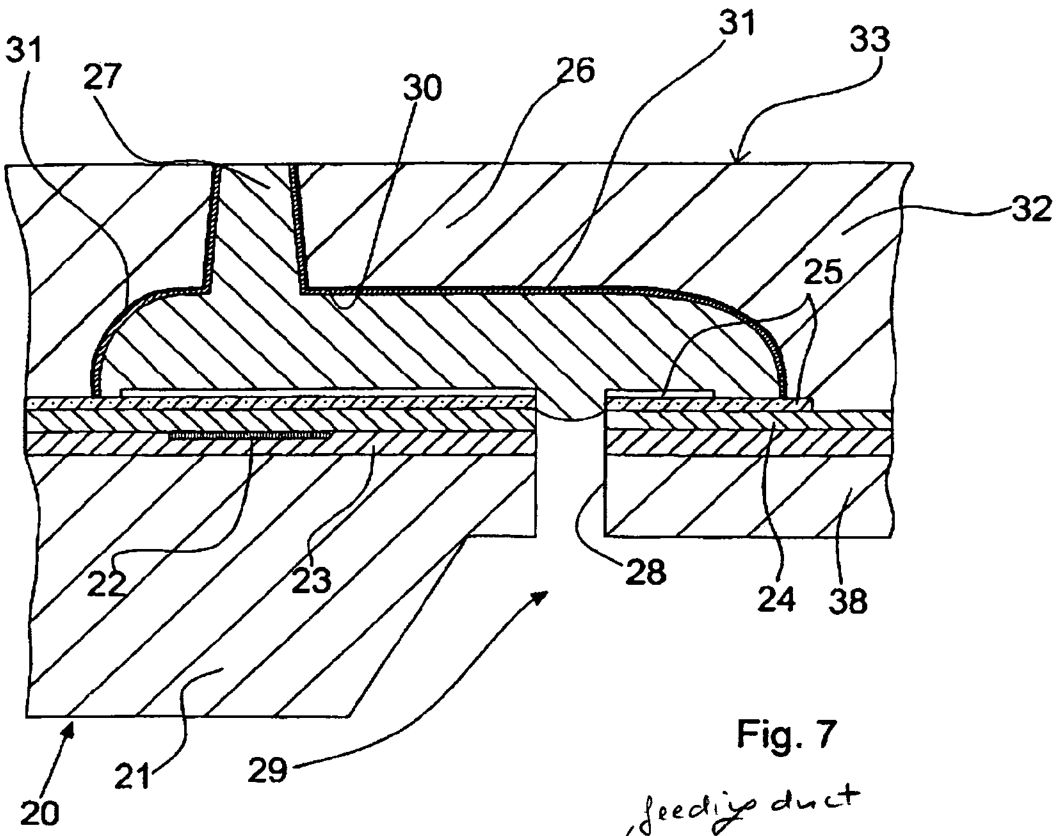

In step 45, illustrated in FIG. 7, lapping is performed of the outer surface 33 of the structural layer 32 so as to completely uncover the upper cap 34 of the cast of copper 27 of the nozzles and to produce a perfectly flat surface of the structural layer 32. This is done by means of a mechanical lapping and simultaneous CMP type chemical treatment (Chemical-Mechanical-Polishing), or other similar process, known to those acquainted with the sector art.

In step 46, anisotropic etching of the slot 29 is performed in the bottom part of the layer of silicon 30 (FIG. 7), by means of a "wet" type technology that uses for instance KOH, or TMHA. Etching of the silicon continues right up to the aperture of the holes 28, so that the thickness of the remaining layer 38 of silicon, in correspondence with the slot 48, is of approximately 10 μm.

In step 47, the sacrificial layer 26, 27 is removed with a chemical etching, conducted by means of a highly acid bath, for example made of a mix of HCl and HNO3 in a solution. Composition of the bath is prepared in such a way as not to attack the metallic layer 30, which adheres tightly to the resin of the structural layer, 32. At the end of this operation, illustrated in FIG. 8, chambers 35, ducts 36 and nozzles 37 are obtained with their inner walls completely coated by the layer 30 of noble metals, and thus effectively protected against the aggressive action of the inks employed.

Figure 8:
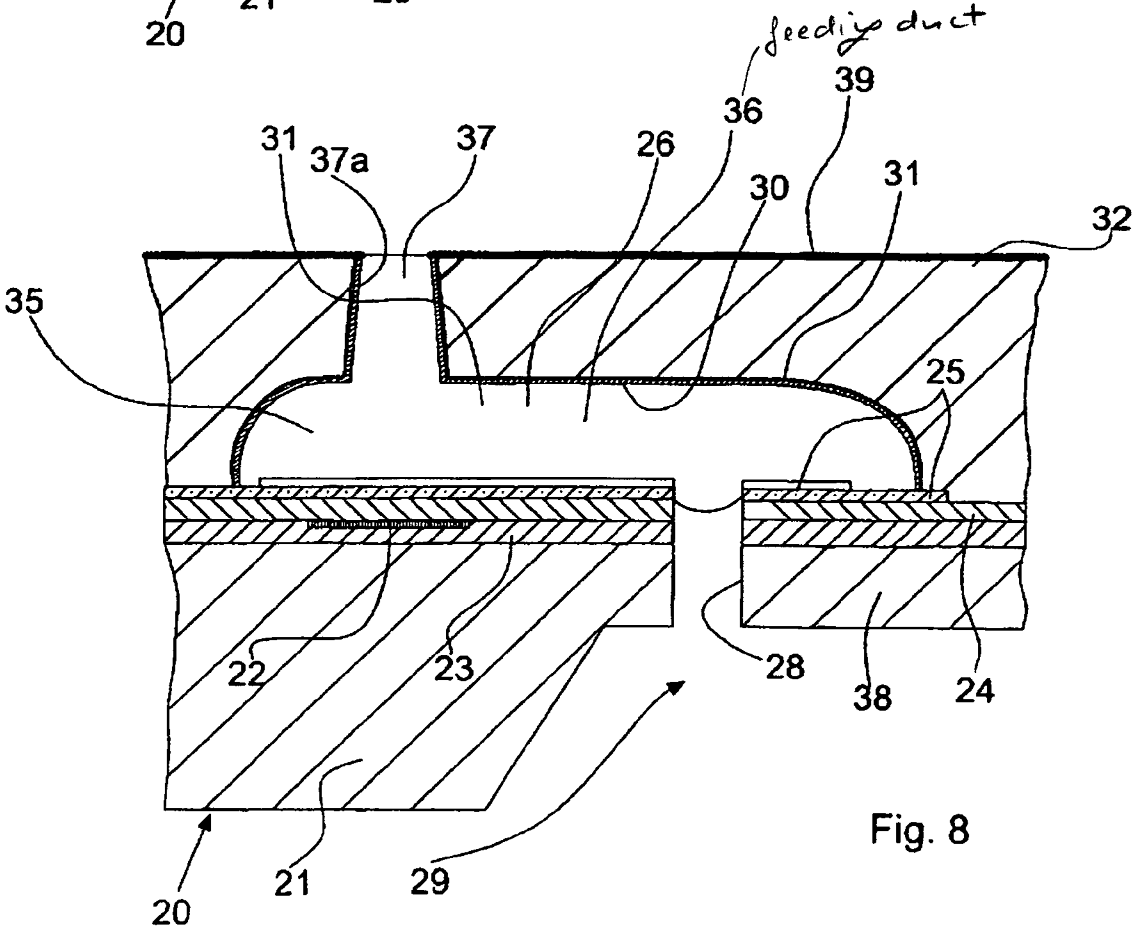

In step 48, illustrated in FIG. 8, a metallic layer 39 to protect the resin, consisting of a noble metal, preferably chromium, and having a thickness of approximately 1000 Å, is deposited on the outer surface of the structural layer 32 by means of vacuum evaporation. Its function is to create a water-repellent outer surface (anti-wetting), offering the resin scratch-proofing and corrosion-proofing properties.

In step 49, the final operations, known to those acquainted with the sector art, are conducted, these are:

dicing of the "wafer" 10 into the single die 12;

soldering of a flat cable, not shown, to the pads on each die 12, through the known TAB process;

mounting of the die with relative flat cable on the container-tank of the head;

filling of the tank with ink and final testing.

It is important to observe that the presence of a layer of noble metal, such as for instance nickel-gold on the copper surface of the sacrificial layer, facilitates its etching by electrochemical means as well, since it forms a continuous electrode inside the chambers and the feeding ducts, preventing the creation of "dead zones" that are isolated from the electrical connection with the "seed layer".

It remains understood that changes, additions, or part substitutions may be made to the ink jet printhead and to the relative manufacturing process, or variants of the manufacturing process, according to this invention, without departing from the scope of the invention.

For instance the protective layer 39, deposited on the structural layer 32 in step 49, may consist of, instead of chromium, magnesium fluoride and oxygen ($MgF_2+O_2$), or of silicon dioxide and chromium ($SiO_2+Cr$).

Also, according to another embodiment, the protective layer 39 may be formed of two overlapping deposits, made of the components indicated above.

The invention claimed is:

1. A process for protectively coating, against aggressive liquids, hydraulic microcircuits made in a resin, said process comprising:

a) providing a die comprising a silicon substrate covered by a plurality of metallic and dielectric layers, and also comprising a sacrificial metallic layer defining the inner shape of said hydraulic microcircuits;

b) depositing on an outer surface of said sacrificial metallic layer, in an electrochemical process, at least one metallic protective coating layer;

c) applying on said metallic protective coating layer an adhesion layer to promote the adhesion of a resin on said metallic protective coating layer;

d) depositing on said adhesion layer a non-photosensitive epoxy or polyamide resin, having a predetermined thickness and completely covering said sacrificial layer;

e) polymerizing said resin to increase its mechanical resistance to mechanical and thermal stresses; and f) removing said sacrificial metallic layer via a chemical etching, by means of a acid bath.

2. The process of claim 1, further comprising:

g) performing, after step e), a planarization of the outer surface of said resin; and h) depositing, after step g), on the outer surface of said resin, in a vacuum evaporation operation, a protective layer.

3. The process of claim 2, wherein step g) is performed through a mechanical lapping and simultaneous CMP type chemical treatment (Chemical-Mechanical-Polishing).

4. The process of claim 1, wherein in step f) the acid bath is made of a mix of HCI and $HNO_3$ in a solution.

5. The process of claim 1, wherein said process is a process for protectively coating an ejection chamber of an ink jet printhead, to reduce damaging effects of aggressive inks, and wherein:

in step a) an array of microcircuits for driving thermal elements for ejection of said ink is made in said plurality of metallic and dielectric layers, and said sacrificial metallic layer is provided with a cast for at least one ejection nozzle, said sacrificial metallic layer and said cast defining the inner shape of (1) a chamber of a feeding duct connected to said sacrificial metallic layer and (2) said at least one ejection nozzle; and step d) of depositing said non-photosensitive epoxy or polyamide resin is performed so as to completely cover said sacrificial layer, including the cast of the nozzle.

6. The process of claim 1, wherein said metallic coating layer is a metal selected from the group consisting of nickel-gold, palladium-gold, and ruthenium.

7. The process of claim 1, wherein said protective layer is selected from the group consisting of a noble metal, magnesium fluoride and oxygen ($MgF_2+O_2$), and silica and chromium ($SiO_2+Cr$).

* * * * *